United States Patent
Park et al.

(10) Patent No.: US 7,352,674 B2
(45) Date of Patent: Apr. 1, 2008

(54) APPARATUS AND METHOD FOR ENCODING WOBBLE SIGNAL TO BE RECORDED ON OPTICAL DISC, AND APPARATUS AND METHOD FOR DECODING WOBBLE SIGNAL READ FROM OPTICAL DISC

(75) Inventors: Jung Bae Park, Anyang-si (KR); Won Bae Joo, Seoul (KR); Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 396 days.

(21) Appl. No.: 10/295,948

(22) Filed: Nov. 18, 2002

(65) Prior Publication Data

US 2003/0099180 A1 May 29, 2003

(30) Foreign Application Priority Data

Nov. 17, 2001 (KR) .................. 10-2001-0071610
Dec. 21, 2001 (KR) .................. 10-2001-0082835

(51) Int. Cl.
*G11B 7/00* (2006.01)
(52) U.S. Cl. .................. 369/59.25; 369/53.34
(58) Field of Classification Search ............. 369/59.25; G11B 7/00
See application file for complete search history.

(56) References Cited

U.S. PATENT DOCUMENTS 6,714,508 B1 * 3/2004 Spruit et al. ............. 369/275.4
6,778,589 B1 * 8/2004 Ishii ............................ 375/136

* cited by examiner

*Primary Examiner*—William Korzuch
*Assistant Examiner*—Joseph Haley
(74) *Attorney, Agent, or Firm*—Birch, Stewart, Kolasch & Birch, LLP

(57) ABSTRACT

Herein disclosed are an apparatus and method for encoding a wobble signal to be recorded on an optical disc, and an apparatus and method for decoding a wobble signal read from the optical disc. The encoding apparatus performs a minimum shift keying modulation operation for a wobble signal to be recorded as physical address information on a writable optical disc, by adjusting a first frequency $f_1$ and second frequency $f_2$ of the wobble signal with coherence. Therefore, a peak point of the wobble signal is formed at a point of time that the frequencies change. The decoding apparatus band pass filters an analog wobble signal read from the optical disc, converts the filtered wobble signal into a digital wobble signal, detects a peak point of the converted digital wobble signal, outputs a peak detection signal with a level transition at the detected peak point, and detects/outputs original wobble data on the basis of the outputted peak detection signal. Therefore, the decoding apparatus is able to accurately decode the wobble signal in a simple manner.

19 Claims, 11 Drawing Sheets

Fig. 1 (Related Art)

| $m_I$ | $m_Q$ | $S_{MSK}(t) = m_I(t)\phi_1(t) + m_Q(t)\phi_2(t) = m_I(t)\cos(\frac{\pi t}{2T_b})\cos(2\pi f_c t) + m_Q(t)\sin(\frac{\pi t}{2T_b})\sin(2\pi f_c t)$ | | |
|---|---|---|---|---|
| | | $\cos(A \pm B) = \cos A \cos B \mp \sin A \sin B$ | | |
| 1 | 1 | $\cos(2\pi f_c t - \frac{\pi t}{2T_b}) = \cos 2\pi(f_c - \frac{1}{4T_b})$ | | $\cos(2\pi f_2 t + 0)$ |
| 1 | 0(-1) | $\cos(2\pi f_c t + \frac{\pi t}{2T_b}) = \cos 2\pi(f_c + \frac{1}{4T_b})$ | ⇒ | $\cos(2\pi f_1 t + 0)$ |
| 0(-1) | 1 | $-\cos(2\pi f_c t + \frac{\pi t}{2T_b}) = \cos[2\pi(f_c + \frac{1}{4T_b}) + \pi]$ | | $\cos(2\pi f_1 t + \pi)$ |
| 0(-1) | 0(-1) | $-\cos(2\pi f_c t - \frac{\pi t}{2T_b}) = \cos[2\pi(f_c - \frac{1}{4T_b}) + \pi]$ | | $\cos(2\pi f_2 t + \pi)$ |
| $f_1 = f_c + \frac{1}{4T_b}$ $f_2 = f_c - \frac{1}{4T_b}$ | | $f_1 - f_2 = \frac{1}{2T_b}$ $f_1 + f_2 = 2f_c$ | $m_I$: Inphase message of Wobble data $m_Q$: Quadrature message of Wobble data $T_b$: Wobble Data Bit Duration | |

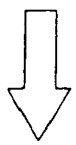

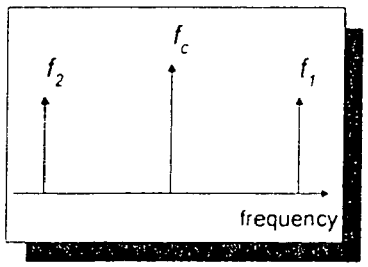

Fig. 8

| Type \ Interval | Item | Frequency | | Phase of $f_2$ | | Phase of $f_1$ | | Component | $(m_I \cdot m_Q)$ | Data |
|---|---|---|---|---|---|---|---|---|---|---|
| | Ref | A | | A | | B | | Component Indicator(CI) | Frequency, Phase | Component $(m_I \cdot m_Q)$ |
| | Value | Threshold/Frequency | | Threshold / Phase | | Threshold / Phase | | | | |
| ⓐ | | Th5 | $f_2$ | Th5 | $\pi$ | X | | High Inphase | (0 · 0) | 0 |
| ⓑ | | Th3 | $f_1$ | X | | Th2 | 0 | Low Quadrature | (1 0) | 0 |
| ⓒ | | Th1 | $f_2$ | Th1 | 0 | X | | High Inphase | (1 . 1) | 1 |
| ⓓ | | Th3 | $f_1$ | X | | Th4 | $\pi$ | Low Quadrature | (0 1) | 1 |
| ⓔ | | Th5 | $f_2$ | Th5 | $\pi$ | X | | High Inphase | (0 . 0) | 0 |

$A = \int_0^{Tb}(PD \oplus PLI\!I)$ $B = \int_0^{Tb}(PD \oplus CI)$

X = don't care $F_1, F_2$ = wobble frequencies of $F_1 > F_2$

Th1, Th2, Th3, Th4, Th5 = Th1>Th2>Th3>Th4>Th5

| MSK | $m_I$ | $m_Q$ |
|---|---|---|
| $\cos(2\pi f_2 t + 0)$ | 1 | 1 |
| $\cos(2\pi f_1 t + 0)$ | 1 | 0(-1) |
| $\cos(2\pi f_1 t + \pi)$ | 0(-1) | 1 |
| $\cos(2\pi f_2 t + \pi)$ | 0(-1) | 0(-1) |

| Item | Decision Condition | Decision |
|---|---|---|
| Frequency | A >= Th1 or A =<Th5 | $f_2$ |
| | else | $f_1$ |
| F1's Phase | B >= Th2 | 0 |
| | B =< Th4 | pi |
| F2's Phase | A >= Th1 | 0 |
| | A =<Th5 | pi |

APPARATUS AND METHOD FOR ENCODING WOBBLE SIGNAL TO BE RECORDED ON OPTICAL DISC, AND APPARATUS AND METHOD FOR DECODING WOBBLE SIGNAL READ FROM OPTICAL DISC

This nonprovisional application claims priority under 35 U.S.C. § 119(a) on Patent Application No. 01-71610 and 01-82835 filed in KOREA on Nov. 17, 2001 and Dec. 21, 2001, respectively, which is herein incorporated by reference.

BACKGROUND OF THE INVENTION

1. Field of the Invention

The present invention relates to an apparatus and method for encoding a wobble signal to be recorded as physical address information on an optical disc such as a writable compact disc (CD) or digital versatile disc (DVD), and an apparatus and method for decoding a wobble signal read from the optical disc.

2. Description of the Related Art

It is common that a writable optical disc, such as a digital versatile disc-random access memory (DVD-RAM) or digital versatile disc-re-writable (DVD-RW), has grooves formed along spiral or concentric tracks. Here, portions of the optical disc other than the grooves are typically called lands. Data can be recorded on only any one or both of each groove and each land according to a writing method. A specific variation is applied to a wall of each groove in a groove formation process, and a specific frequency signal is generated based on the specific variation in a recording/reproduction process, so it can be used as auxiliary clock means. Here, the specific variation is called a wobble and the specific frequency signal is called a wobble signal.

On the other hand, physical address information must be pre-recorded on the optical disc. A description will hereinafter be given of wobble addressing methods for forming and recording physical address information on the optical disc in the form of a wobble.

A wobble addressing method based on complementary allocated pit addressing (CAPA) is used for a DVD-RAM, and a wobble addressing method based on land pre-pit addressing is used for a DVD-RW. In addition, a wobble addressing method based on minimum shift keying (MSK) modulation has been proposed.

In the MSK modulation-based wobble addressing method, as shown in FIG. 1, two different frequencies $f_1$ and $f_2$ and two different phases $P_1$ and $P_2$ are decided based on a combination of an inphase message $m_I$ and quadrature message $m_Q$ of wobble data to be formed and recorded as physical address information on the optical disc, and wobble signals with four different waveforms are generated according to the two different frequencies and the two different phases.

For example, the first one $f_1$ of the two different frequencies $f_1$ and $f_2$ is higher than a center frequency $f_c$ and the second frequency $f_2$ is lower than the center frequency $f_c$. Also, the first one $P_1$ of the two different phases $P_1$ and $P_2$ is zero and the second phase $P_2$ is 180° ($\pi$). As a result, an MSK-modulated wobble signal having four different waveforms generated according to the first and second frequencies and the first and second phases, namely, $\cos(2\pi f_2 t + 0)$, $\cos(2\pi f_1 t + 0)$, $\cos(2\pi f_1 t + \pi)$ and $\cos(2\pi f_2 t + \pi)$ can be expressed by the following equation:

$$S_{MSK}(t) = m_I(t)\phi_1(t) + m_Q(t)\phi_2(t) \quad \text{[Equation 1]}$$

$$= m_I(t)\cos\left(\frac{\pi t}{2T_b}\right)\cos(2\pi f_c t) +$$

$$m_Q(t)\sin\left(\frac{\pi}{2T}\right)\sin(2\pi f_c t)$$

where, $T_b$ represents a wobble data bit duration.

On the other hand, a combination of the inphase message $m_I$ and quadrature message $m_Q$ of wobble data to be recorded on the optical disc must always be expressed as $(m_I, m_Q)$. In this regard, in the case where wobble data to be recorded on the optical disc has a bit stream '11010000' as shown in FIG. 2, a combination $(m_I, m_Q)$ of the inphase message $m_I$ and quadrature message $m_Q$ of the first bit '1' becomes (1,1) by a combination with the second bit '1', a message combination $(m_I, m_Q)$ of the second bit '1' becomes (0,1) by a combination with the third bit '0', a message combination $(m_I, m_Q)$ of the third bit '0' becomes (1,0) by a combination with the fourth bit '1', a message combination $(m_I, m_Q)$ of the fourth bit '1' becomes (0,1) by a combination with the fifth bit '0', and a message combination $(m_I, m_Q)$ of the fifth bit '0' becomes (0,0) by a combination with the sixth bit '0'. That is, a combination $(m_I, m_Q)$ of the inphase message $m_I$ and quadrature message $m_Q$ of a wobble data bit is any one of (1,1), (1,0), (0,1) and (0,0), and signals corresponding thereto have four different waveforms with two different frequencies and two different phases, as shown in FIG. 2.

Therefore, an MSK-modulated wobble signal $S_{MSK}(t)$ has a smoothly consecutive waveform resulting from the summing-up of the above signals, so it can be more accurately recorded on the optical disc.

On the other hand, a conventional decoding apparatus for decoding an MSK-modulated wobble signal read from the optical disc comprises, as shown in FIG. 3, analog mixers 10 and 11, interval integrators 12 and 13, phase decision devices 14 and 15, and a logic circuit 16.

The analog mixers 10 and 11 multiply a wobble signal read from the optical disc by first and second encoding frequencies $\phi_1(t)$ and $\phi_2(t)$ to extract wobble signals of specific frequencies, respectively. The interval integrators 12 and 13 integrate the extracted wobble signals of the specific frequencies for predetermined intervals, respectively. The phase decision devices 14 and 15 compare the integrated values with a predetermined threshold value (Threshold=0) to decide phases, respectively. The logic circuit 16 interleaves the decided phases to restore a binary sequence of bit stream data (i.e., original wobble data). As a result, an MSK-modulated wobble signal, recorded in a smoothly consecutive waveform according to the MSK modulation method, is demodulated into wobble data with no high-frequency noise by the decoding apparatus with the above-mentioned construction.

However, the above-mentioned conventional decoding apparatus has a disadvantage in that a complex hardware configuration is required to multiply a wobble signal read from the optical disc by the first and second encoding frequencies $\phi_1(t)$ and $\phi_2(t)$ and integrate the resulting signals.

Further, in the case where the optical disc varies in rotational speed by a spindle servo operation of an optical disc apparatus, the wobble signal read from the optical disc varies in frequency, so the first and second encoding frequencies $\phi_1(t)$ and $\phi_2(t)$ applied respectively to the analog mixers 10 and 11 must vary. To this end, a complex hardware configuration and demodulation algorithm must be provided in the decoding apparatus.

SUMMARY OF THE INVENTION

Therefore, the present invention has been made in view of the above problems, and it is an object of the present invention to provide an apparatus and method for encoding a wobble signal to be recorded as physical address information on a writable optical disc, in such a manner that the wobble signal can be accurately decoded according to a simple hardware configuration and algorithm in a decoding process.

It is another object of the present invention to provide an apparatus and method for accurately decoding a wobble signal read from an optical disc according to a simple hardware configuration and algorithm.

In accordance with one aspect of the present invention, the above and other objects can be accomplished by the provision of a method for encoding wobble data to be recorded as physical address information on an optical disc in a minimum shift keying modulation manner, comprising the steps of a) combining an inphase message and quadrature message of the wobble data; and b) deciding a first frequency $f_1$ and second frequency $f_2$ and a first phase and second phase of a corresponding wobble signal according to the combination of the inphase message and quadrature message such that the first frequency and second frequency are $$f_1 = \frac{k}{2T_b} \text{ and } f_2 = \frac{p}{2T_b}$$

($T_b$=wobble data bit duration) under the condition that k,p=natural numbers and k–p=1, respectively, and modulating the wobble signal on the basis of the decided first and second frequencies and first and second phases.

In accordance with another aspect of the present invention, there is provided an apparatus for encoding wobble data to be recorded as physical address information on an optical disc in a minimum shift keying modulation manner, comprising combination means for combining an inphase message and quadrature message of the wobble data; decision means for deciding a first frequency $f_1$ and second frequency $f_2$ and a first phase and second phase of a corresponding wobble signal according to the combination of the inphase message and quadrature message such that the first frequency and second frequency are $$f_1 = \frac{k}{2T_b} \text{ and } f_2 = \frac{p}{2T_b}$$

($T_b$=wobble data bit duration) under the condition that k,p=natural numbers and k–p=1, respectively; and modulation means for modulating a wobble signal having four types of waveforms on the basis of the decided first and second frequencies and first and second phases.

In accordance with a further aspect of the present invention, there is provided a method for decoding a wobble signal read from an optical disc, comprising the steps of a) band pass filtering an analog wobble signal read from the optical disc and converting the filtered wobble signal into a digital wobble signal; b) detecting a peak point of the converted digital wobble signal and outputting a peak detection signal with a level transition at the detected peak point; and c) detecting/outputting original wobble data on the basis of the outputted peak detection signal.

In accordance with yet another aspect of the present invention, there is provided an apparatus for decoding a wobble signal read from an optical disc, comprising filtering means for band pass filtering an analog wobble signal read from the optical disc; analog/digital (A/D) conversion means for converting the band pass filtered analog wobble signal into a digital wobble signal; slope detection means for detecting a slope of the converted digital wobble signal; peak detection means for generating and outputting a peak detection signal, the peak detection signal having a high level transition at a point of time that the slope changes from negative to positive, and a low level transition at a point of time that the slope changes from positive to negative; and wobble data output means for detecting/outputting original wobble data on the basis of the outputted peak detection signal.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a table showing general equations and conditions applied to wobble signal MSK modulation;

FIG. 8 is a table showing reference information applied to the wobble signal decoding method in accordance with the embodiment of the present invention;

DESCRIPTION OF THE PREFERRED EMBODIMENTS

Figure 2:
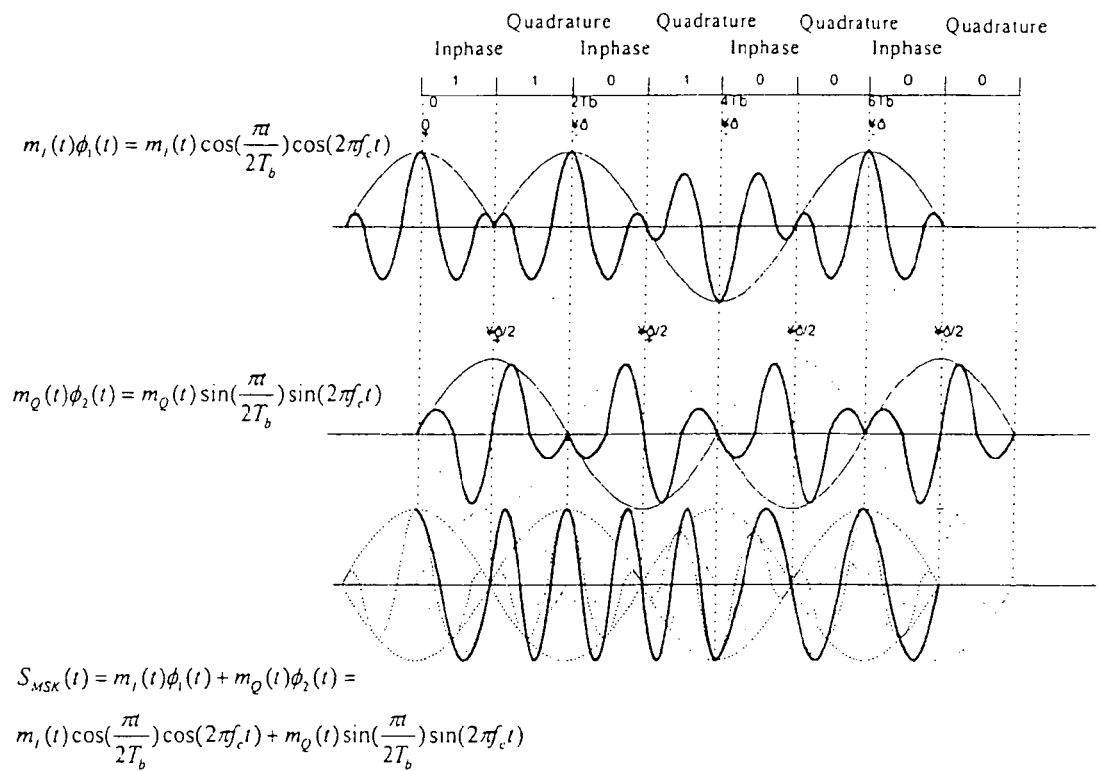
FIG. 2 is a waveform diagram of a wobble signal MSK-modulated according to a general MSK modulation method.
Figure 3:
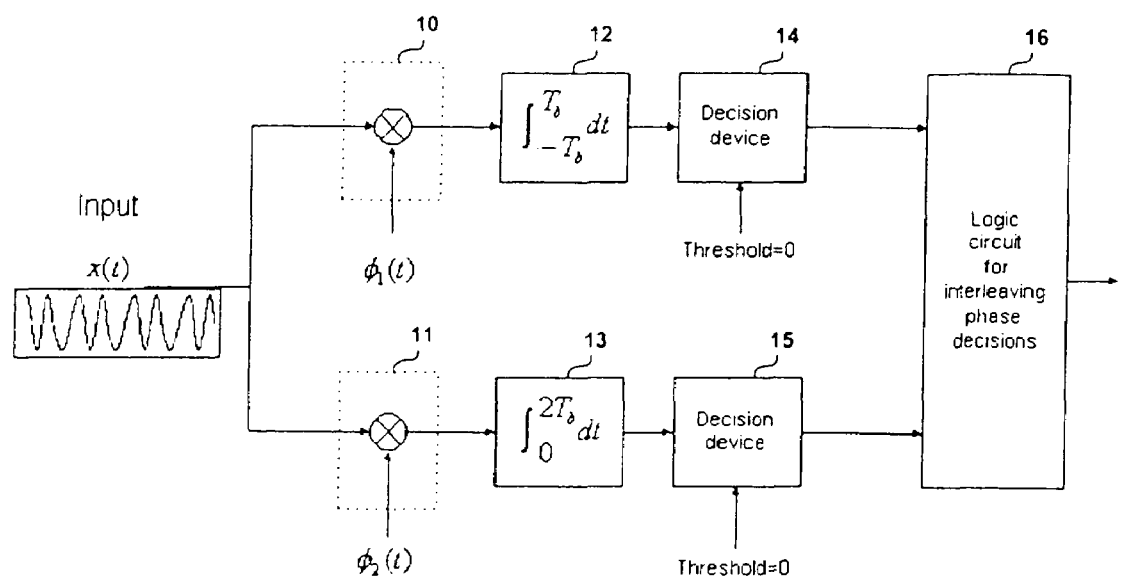
FIG. 3 is a block diagram showing the construction of a conventional decoding apparatus for decoding an MSK-modulated wobble signal.
Figure 4:
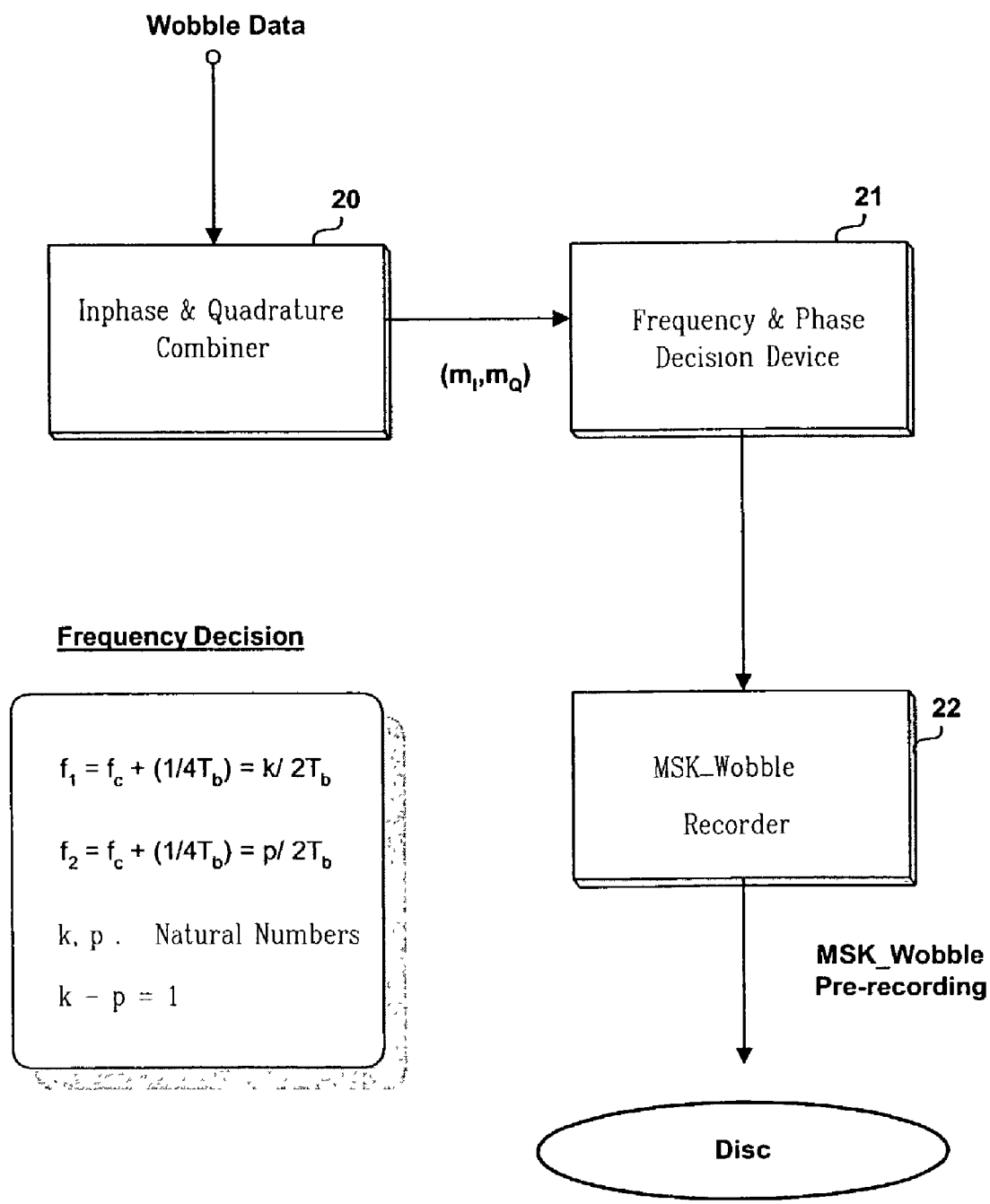
FIG. 4 is a block diagram showing the construction of a wobble signal encoding apparatus in accordance with a preferred embodiment of the present invention.

With reference to FIG. 4, there is shown in block form the construction of an encoding apparatus for encoding a wobble signal to be recorded on an optical disc in accordance with a preferred embodiment of the present invention. As shown in this drawing, the encoding apparatus comprises an inphase/quadrature message combiner 20, a frequency/phase decision device 21, and an MSK wobble signal recorder 22.

The inphase/quadrature message combiner 20 always combines an inphase message $m_I$ and quadrature message $m_Q$ of wobble data to be recorded as physical address information on the optical disc into ($m_I$, $m_Q$), as stated previously.

The frequency/phase decision device 21 decides two different frequencies $f_1$ and $f_2$ and two different phases $P_1$ and $P_2$ according to a value of the combination ($m_I$, $m_Q$), namely, any one of (1,1), (1,0), (0,1) and (0,0) to generate an MSK-modulated wobble signal having four different waveforms, namely, $\cos(2\pi f_2 t+0)$, $\cos(2\pi f_1 t+0)$, $\cos(2\pi f_1 t+\pi)$ and $\cos(2\pi f_2 t+\pi)$. At this time, the first and second frequencies are decided to have values satisfying the following equations, respectively:

$$f_1 = f_c + \frac{1}{4T_b} = \frac{k}{2T_b} \quad \text{[Equation 2]}$$

$$f_2 = f_c - \frac{1}{4T_b} = \frac{p}{2T_b} \quad \text{[Equation 3]}$$

where, k and p are natural numbers and k−p=1.

In other words, the frequency/phase decision device 21 decides the first and second frequencies $f_1$ and $f_2$ to have values satisfying the equations 2 and 3 defined in an MSK modulation method under the condition that k and p are natural numbers and k−p=1, respectively. Satisfying these conditions (k and p are natural numbers and k−p=1), the minimum or maximum peak point of the MSK-modulated wobble signal is always formed at a point of time that the first frequency $f_1$ and the second frequency $f_2$ change.

A detailed description will hereinafter be given of the case where the first frequency and second frequency are decided respectively as, for example, $$f_1 = \frac{3}{2T_b} \text{ and } f_2 = \frac{2}{2T_b}$$

satisfying k=3, p=2 and k−p=1.

Figure 5:
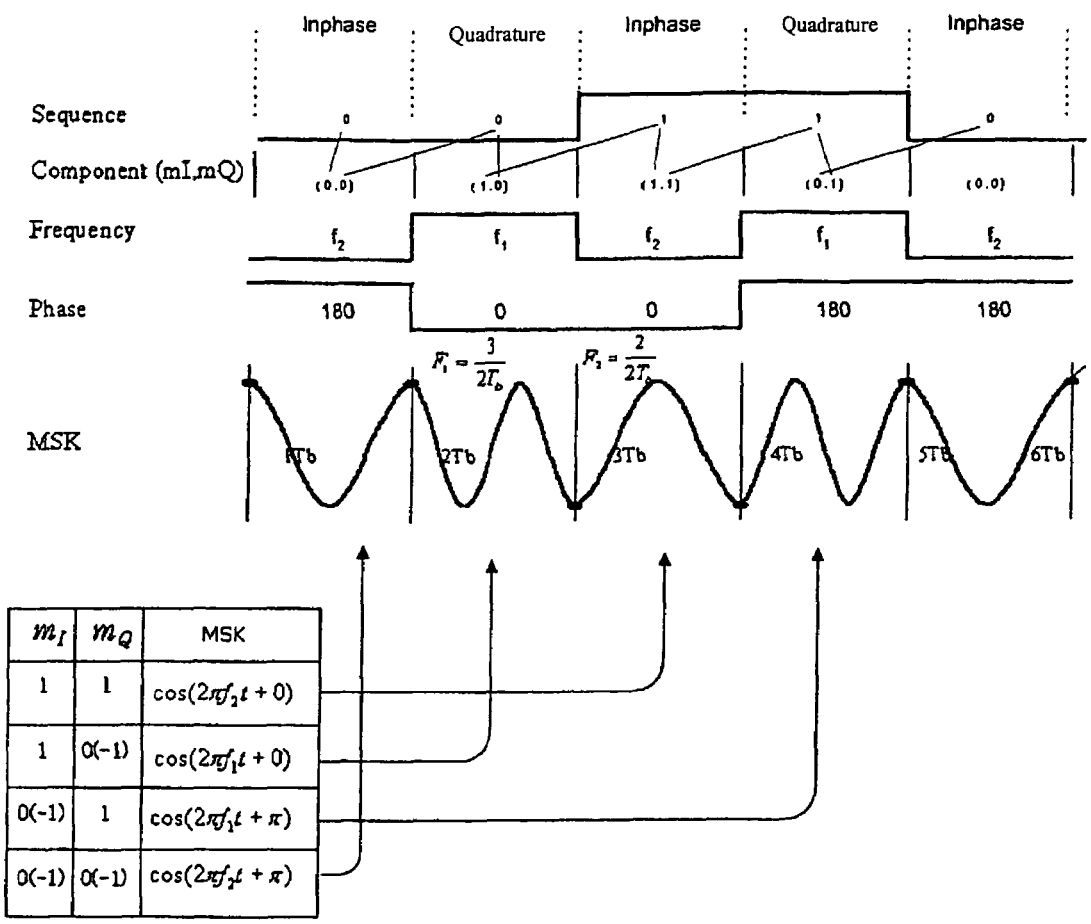
FIG. 5 is a waveform diagram of a wobble signal MSK-modulated by a wobble signal encoding method in accordance with the embodiment of the present invention.

A combination of the inphase message $m_I$ and quadrature message $m_Q$ of wobble data to be recorded on the optical disc must always be expressed as ($m_I$, $m_Q$). In this regard, in the case where wobble data to be recorded on the optical disc has a bit stream '00110' as shown in FIG. 5, a message combination ($m_I$, $m_Q$) of the first bit '0' becomes (0,0) by a combination with the second bit '0', a message combination ($m_I$, $m_Q$) of the second bit '0' becomes (1,0) by a combination with the third bit '1', a message combination ($m_I$, $m_Q$) of the third bit '1' becomes (1,1) by a combination with the fourth bit '1', and a message combination ($m_I$, $m_Q$) of the fourth bit '1' becomes (0,1) by a combination with the fifth bit '0'.

Accordingly, a pulse signal of $\cos(2\pi f_2 t+\pi)$ having the second frequency $f_2$ and 180° phase ($\pi$) is generated by the message combination ($m_I$, $m_Q$=0,0) of the first bit '0', and a pulse signal of $\cos(2\pi f_1 t+0)$ having the first frequency $f_1$ and zero phase is generated by the message combination ($m_I$, $m_Q$=1,0) of the second bit '0'.

Also, a pulse signal of $\cos(2\pi f_2 t+0)$ having the second frequency $f_2$ and zero phase is generated by the message combination ($m_I$, $m_Q$=1,1) of the third bit '1', and a pulse signal of $\cos(2\pi f_1 t+\pi)$ having the first frequency $f_1$ and 180° phase ($\pi$) is generated by the message combination ($m_I$, $m_Q$=0,1) of the fourth bit '1'.

That is, satisfying the above conditions that k and p are natural numbers and k−p=1, the MSK-modulated wobble signal has a minimum or maximum peak point at a point of time that the first frequency and the second frequency change.

The MSK wobble signal recorder 22 forms and records a wobble-shaped groove on the optical disc using the wobble signal MSK-modulated in the above manner.

Figure 6:
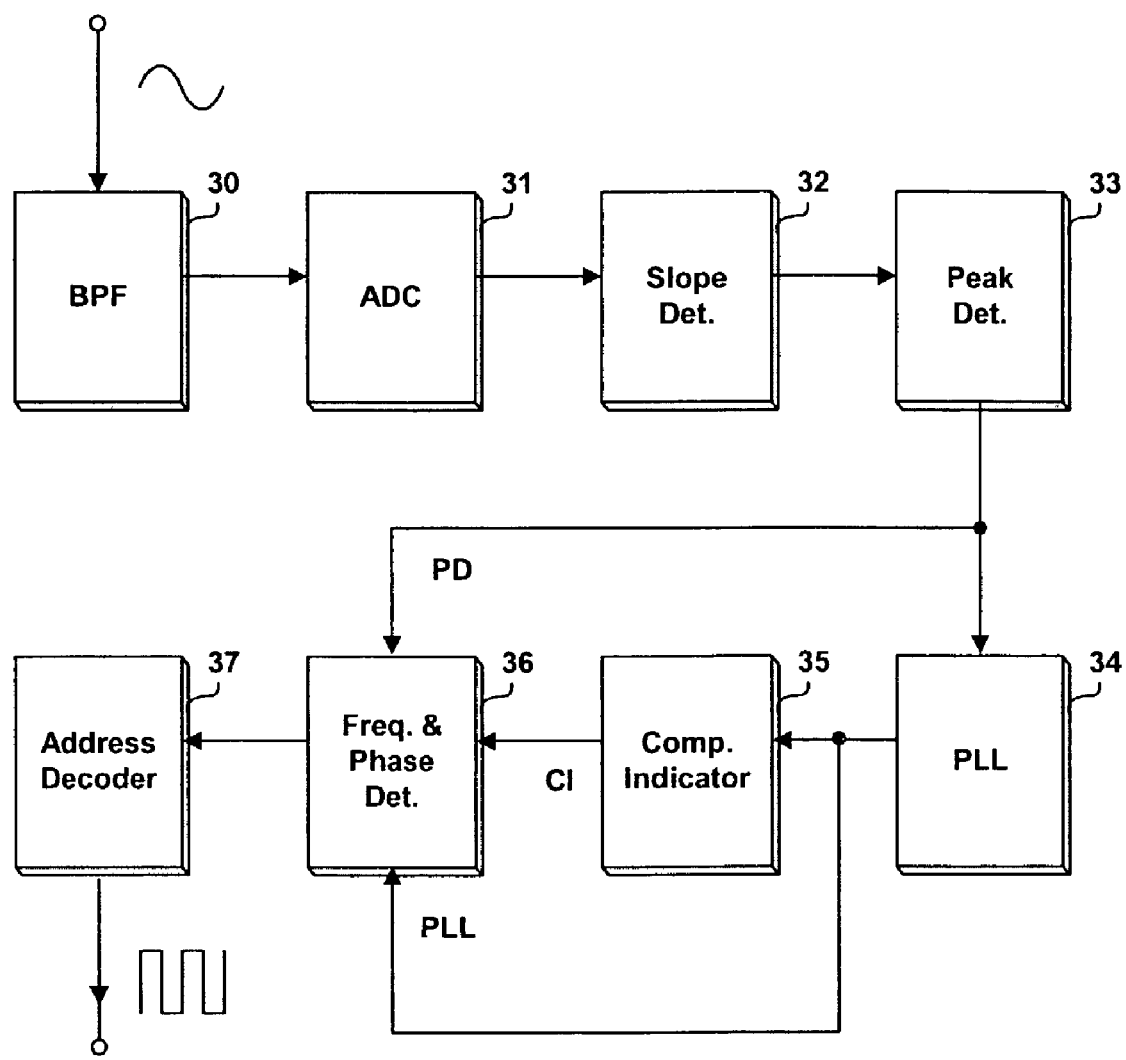
FIG. 6 is a block diagram showing the construction of a wobble signal decoding apparatus in accordance with the embodiment of the present invention.

FIG. 6 shows the construction of a wobble signal decoding apparatus in accordance with the embodiment of the present invention, which is adapted to decode a wobble signal read from the optical disc where a wobble-shaped groove is formed using a wobble signal MSK-modulated in the above manner. As shown in this drawing, the wobble signal decoding apparatus comprises a band pass filter (BPF) 30, an analog/digital (A/D) converter (ADC) 31, a slope detector 32, a peak detector 33, a wobble phase locked loop (PLL) circuit 34, a component indicator 35, a frequency/phase detector 36, and an address decoder 37.

The band pass filter 30 filters an analog wobble signal read from the optical disc at a predetermined frequency band to remove a high-frequency noise component, etc. therefrom. The A/D converter 31 converts the band pass filtered analog wobble signal into a digital wobble signal.

The slope detector 32 detects a slope of the A/D-converted digital wobble signal. The peak detector 33 detects a point where the detected slope changes from negative to positive as a minimum peak point, and a point where the detected slope changes from positive to negative as a maximum peak point, respectively, and outputs a peak detection signal corresponding to the detected minimum and maximum peak points.

The wobble PLL circuit 34 outputs a wobble PLL signal synchronized with the peak detection signal. At this time, the wobble PLL signal is synchronized with a lowest one of a plurality of frequencies (i.e., a signal with a longest period) included in the peak detection signal.

The component indicator 35 repeatedly outputs a component indicator signal CI with a high/low level transition at a rising edge of the wobble PLL signal.

Figure 7:
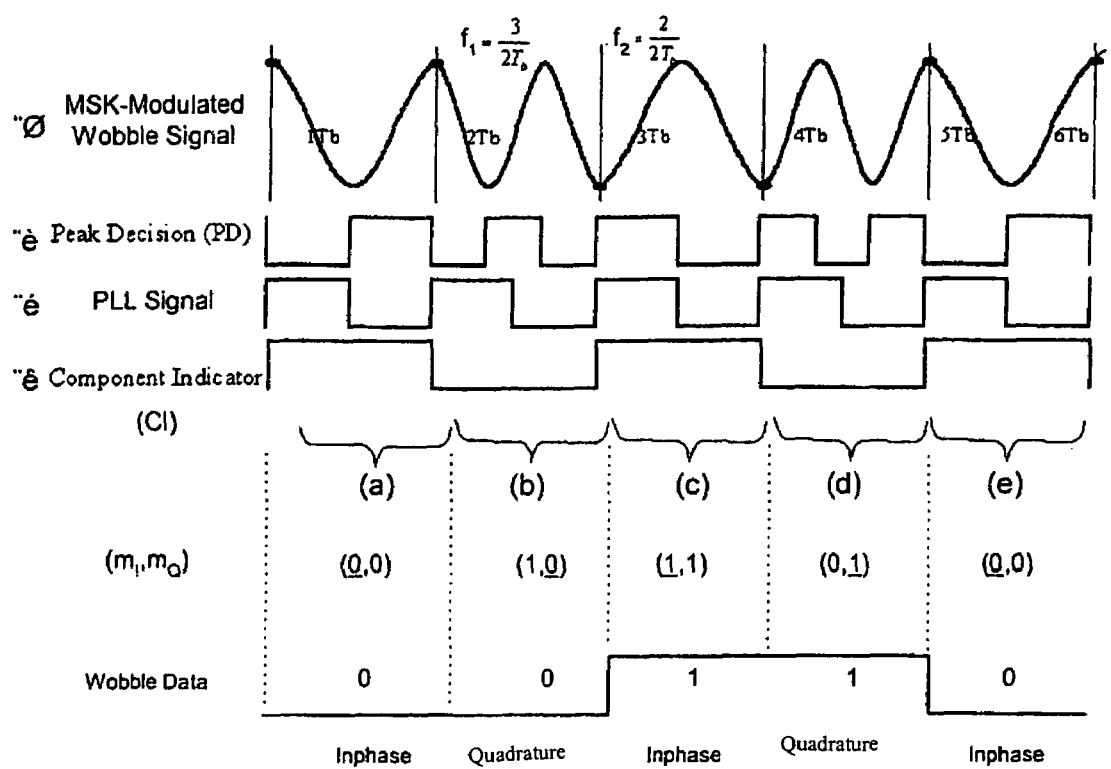
FIG. 7 is a waveform diagram of signals and wobble data detected and demodulated by a wobble signal decoding method in accordance with the embodiment of the present invention.

For example, as shown in FIG. 7, in the case where an MSK-modulated wobble signal outputted through the band pass filter 30 and A/D converter 31 is a signal □ having four waveforms (namely, $\cos(2\pi f_2 t+\pi)$, $\cos(2\pi f_1 t+0)$, $\cos(2\pi f_2 t+0)$ and $\cos(2\pi f_1 t+\pi)$) with two different frequencies $f_1$ and $f_2$ and two different phases, the peak detector 33 detects a point where a slope of the MSK-modulated wobble signal changes from negative to positive as a minimum peak point, and a point where the wobble signal slope changes from positive to negative as a maximum peak point, respectively, and outputs a peak detection signal □ with high and low level transitions at the minimum and maximum peak points.

On the other hand, the wobble PLL circuit 34 outputs a wobble PLL signal □ which has high and low levels repeatedly 50% by 50% synchronously with the second frequency $f_2$ of the peak detection signal. The component indicator 35 outputs a component indicator signal □ with a high/low level transition at a rising edge of the wobble PLL signal.

The component indicator signal, peak detection signal and wobble PLL signal are inputted to the frequency/phase detector 36. As shown in FIG. 8, in each interval □, □, □, □, . . . corresponding to one wobble data bit duration $T_b$, the frequency/phase detector 36 XORes the peak detection signal PD and the wobble PLL signal PLL and integrates the XORed result $$\left(A = \int_0^{T_b} (PD \oplus PLL)\right).$$

Also, the frequency/phase detector 36 XORes the peak detection signal PD and the component indicator signal CI and integrates the XORed result $$\left(B = \int_0^{T_b} (PD \oplus CI)\right).$$

Then, the frequency/phase detector 36 detects whether each of the integrated values A and B approximates which one of a plurality of predetermined threshold values (for example, Th1=0, Th2=33, Th3=50, Th4=66 and Th5=100).

Accordingly, because, in the interval □ shown in FIG. 7, the value A obtained by XORing the peak detection signal PD and the wobble PLL signal PLL and integrating the XORed result approximates Th5=100 assuming that 100 is the maximum, the frequency/phase detector 36 detects the second frequency $f_2$ and 180° phase with reference to a demodulation table shown in FIG. 8. In the interval □ in FIG. 7, the value A obtained by XORing the peak detection signal PD and the wobble PLL signal PLL and integrating the XORed result approximates Th3=50 assuming that 100 is the maximum. As a result, the frequency/phase detector 36 detects the first frequency $f_1$ with reference to the demodulation table. Also in this interval □, the value B obtained by, XORing the peak detection signal PD and the component indicator signal CI and integrating the XORed result approximates Th2=33 assuming that 100 is the maximum, so the frequency/phase detector 36 detects the zero phase. Further, because, in the interval □ shown in FIG. 7, the value A obtained by XORing the peak detection signal PD and the wobble PLL signal PLL and integrating the XORed result approximates Th1=0 assuming that 100 is the maximum, the frequency/phase detector 36 detects the second frequency $f_2$ and zero phase with reference to the demodulation table. In the interval □ in FIG. 7, the value A obtained by XORing the peak detection signal PD and the wobble PLL signal PLL and integrating the XORed result approximates Th3=50 assuming that 100 is the maximum. As a result, the frequency/phase detector 36 detects the first frequency $f_1$ with reference to the demodulation table. Also in this interval □, the value B obtained by XORing the peak detection signal PD and the component indicator signal CI and integrating the XORed result approximates Th4=66 assuming that 100 is the maximum, so the frequency/phase detector 36 detects the 180° phase.

In this manner, the frequency/phase detector 36 simply detects the frequency and phase of the MSK-modulated wobble signal in each interval corresponding to one wobble data bit duration $T_b$, and outputs information regarding the detected frequency and phase to the address decoder 37.

On the other hand, the address decoder 37 detects a value of $(m_I, m_Q)$ combined in the MSK wobble signal modulation process in the reverse order on the basis of the detected frequency and phase. That is, as shown in FIG. 8, in the case where the second frequency $f_2$ and 180° phase are detected in the interval □ in FIG. 7, the $(m_I, m_Q)$ value is (0,0), so the address decoder 37 decodes a corresponding wobble data bit value into '0'. In the case where the first frequency $f_1$ and zero phase are detected in the interval □ in FIG. 7, the $(m_I, m_Q)$ value is (1,0), so the address decoder 37 decodes a corresponding wobble data bit value into '0'. In the case where the second frequency $f_2$ and zero phase are detected in the interval □ in FIG. 7, the $(m_I, m_Q)$ value is (1,1), so the address decoder 37 decodes a corresponding wobble data bit value into '1'. In the case where the first frequency $f_1$ and 180° phase are detected in the interval □ in FIG. 7, the $(m_I, m_Q)$ value is (0,1), so the address decoder 37 decodes a corresponding wobble data bit value into '1'. In this manner, the address decoder 37 sequentially decodes a bit stream of original wobble data '0011 . . . '.

As described above, the wobble signal decoding apparatus and method are adapted to demodulate an MSK-modulated wobble signal in the following manner. Namely, the decoding apparatus and method simply extract information regarding a modulation frequency and phase of the MSK-modulated wobble signal using a peak detection signal with a level transition at a peak point of the wobble signal and a wobble PLL signal synchronized with the peak detection signal, and demodulate the MSK-modulated wobble signal on the basis of the extracted frequency and phase information. Therefore, a hardware configuration for demodulation of an MSK-modulated wobble signal can be simplified and a stable wobble signal demodulation operation can be performed even though a wobble signal read from the optical disc varies in frequency.

However, in order to obtain the above effects, a wobble PLL circuit must be provided and an algorithm and hardware configuration for discrimination of a modulation frequency and phase are required. A detailed description will hereinafter be given of a more improved wobble signal encoding apparatus and method and wobble signal decoding apparatus and method which can allow the wobble PLL circuit and the algorithm and hardware configuration for modulation frequency/phase discrimination to be omitted.

The frequency/phase decision device 21 in FIG. 4 decides the first and second frequencies $f_1$ and $f_2$ to have values satisfying the equations 2 and 3 defined in the MSK modulation method under the condition that k and p are natural numbers and k−p=1, respectively. At this time, the first frequency $f_1$ and the second frequency $f_2$ are decided to have values satisfying $$f_1 = \frac{(2n+1)}{2T_b} \text{ and } f_2 = \frac{2n}{2T_b},$$

respectively.

That is, the first frequency $f_1$ and the second frequency $f_2$ are decided in such a manner that the value k of the first frequency $f_1$ is an odd number which is 3 or more, namely, k=2n+1 and the value p of the second frequency $f_2$ is an even number which is 2 or more, namely, p=2n.

Figure 9:
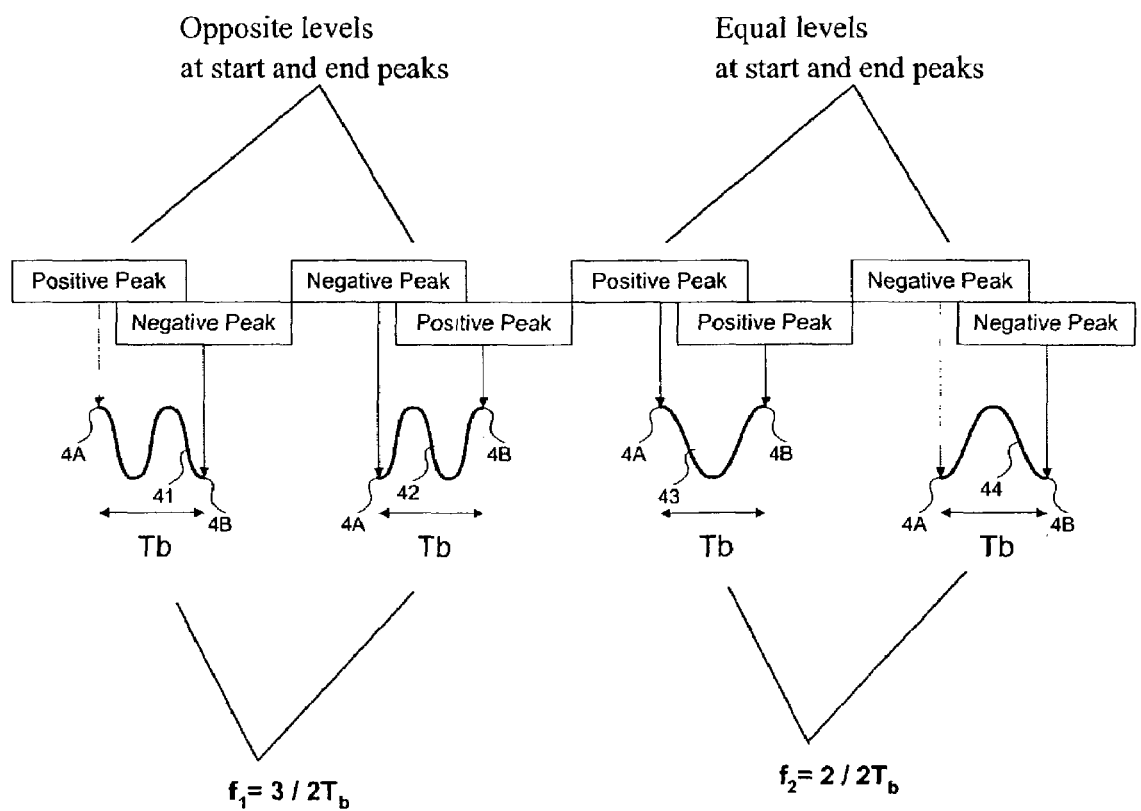
FIG. 9 is a waveform diagram of analog wobble signals of a first frequency and second frequency decided by a wobble signal encoding apparatus and method in accordance with an alternative embodiment of the present invention.

For example, in the case where the value k of the first frequency $f_1$ is '3' and the value p of the second frequency $f_2$ is '2', the first frequency $f_1$ and the second frequency $f_2$ become $$f_1 = \frac{3}{2T_b} \text{ and } f_2 = \frac{2}{2T_b},$$

respectively. In this case, as shown in FIG. 9, each of the analog wobble signals 41 and 42 based on the first frequency $f_1$ is contrary at its start and end peaks 4A and 4B, and each of the analog wobble signals 43 and 44 based on the second frequency $f_2$ is equal at its start and end peaks 4A and 4B.

Thus, the same operation as pre-coding by an XOR operation is performed which outputs '1' if the current data value and the next data value are different and '0' if they are equal. As a result, the respective analog wobble signals have the same waveforms as those by direct modulations of pre-coded data, so they are directly connected with the original wobble bit data.

In other words, because the analog wobble signal based on the first frequency $f_1$ is contrary at the start and end peaks, it is the same as a directly modulated signal of the original wobble bit data '1'. Also, the analog wobble signal based on the second frequency $f_2$ is equal at the start and end peaks, it is the same as a directly modulated signal of the original wobble bit data '0'.

Figure 10:
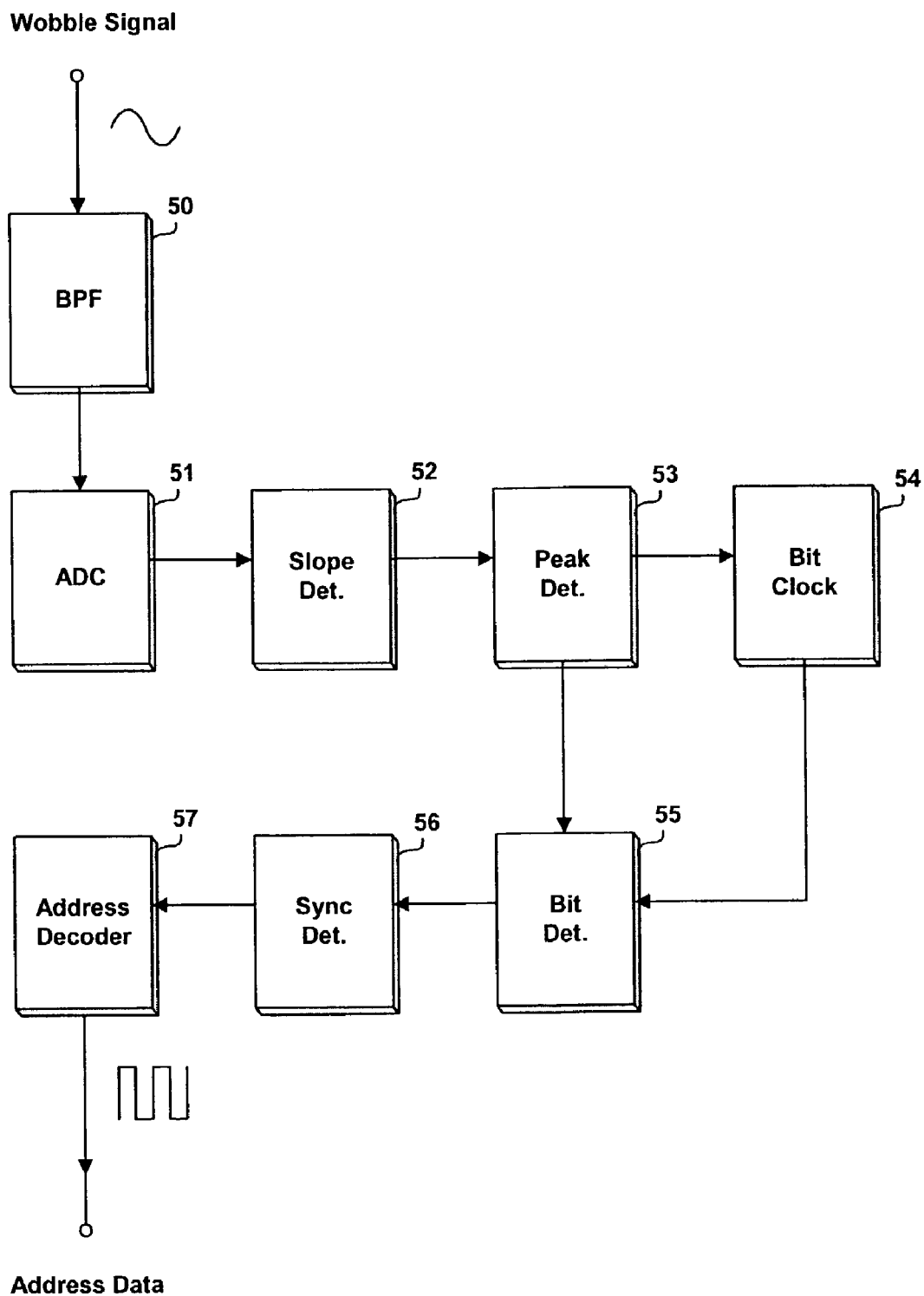
FIG. 10 is a block diagram showing the construction of a wobble signal decoding apparatus in accordance with the second embodiment of the present invention.

FIG. 10 shows the construction of the wobble signal decoding apparatus in accordance with the second embodiment of the present invention, which is adapted to decode a wobble signal read from the optical disc where a wobble-shaped groove is formed using a wobble signal MSK-modulated in the above manner. As shown in this drawing, the wobble signal decoding apparatus comprises a band pass filter 50, an A/D converter 51, a slope detector 52, a peak detector 53, a clock detector 54, a bit detector 55, a synchronous detector 56 and an address decoder 57.

The band pass filter 50 filters an analog wobble signal read from the optical disc at a predetermined frequency band to remove a high-frequency noise component, etc. therefrom. The A/D converter 51 converts the band pass filtered analog wobble signal into a digital wobble signal.

The slope detector 52 detects a slope of the A/D-converted digital wobble signal. The peak detector 53 detects a point where the detected slope changes from negative to positive as a minimum peak point, and a point where the detected slope changes from positive to negative as a maximum peak point, respectively, and outputs a peak detection signal corresponding to the detected minimum and maximum peak points.

Figure 11:
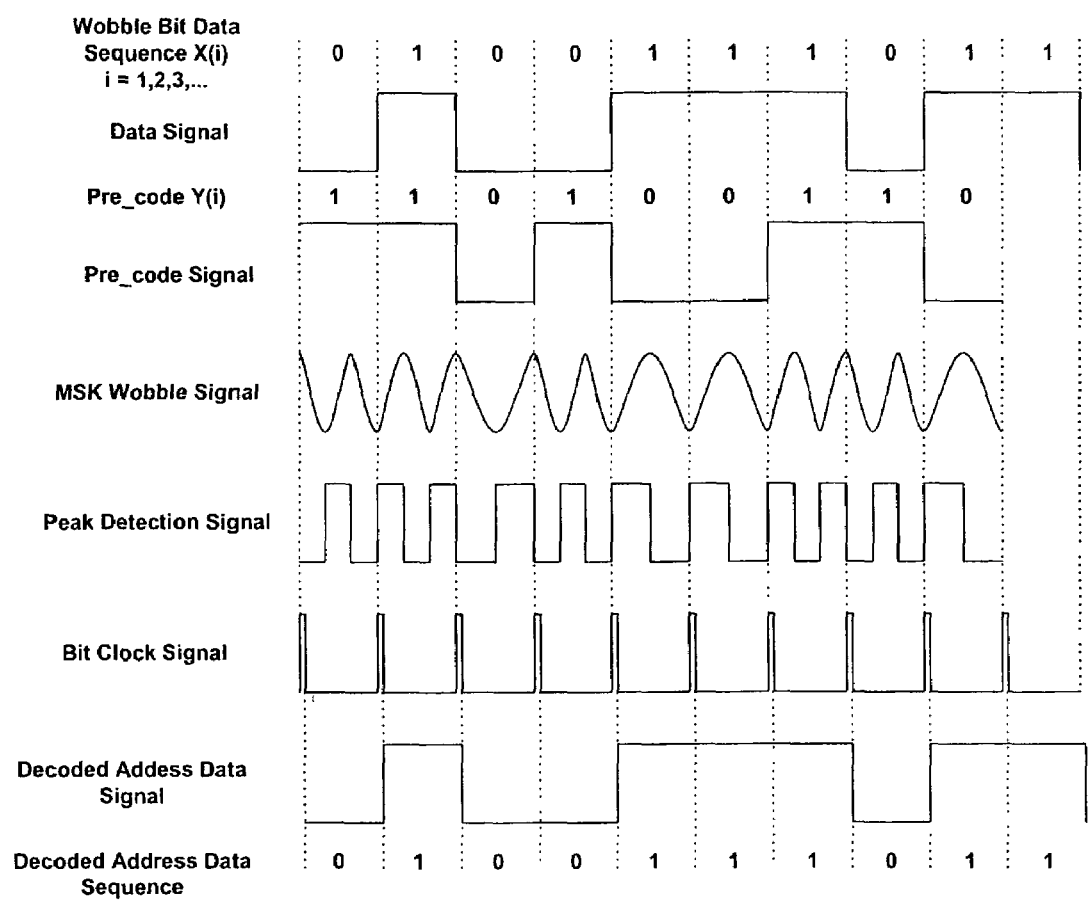
FIG. 11 is a waveform diagram of signals and wobble data detected and demodulated by a wobble signal decoding method in accordance with the second embodiment of the present invention.

For example, as shown in FIG. 11, if the original wobble bit data '0100111011' is XORed and pre-coded, the pre-coded data becomes '110100110'. If the pre-coded data is modulated into an analog wobble signal by the first frequency $f_1$ and second frequency $f_2$, the modulated wobble signal has a pulse waveform with opposite or equal levels at its start and end peaks.

As a result, the peak detector 53 outputs a peak detection signal having two types of different level transition periods.

At this time, the clock detector 54 detects the level transition periods, respectively, and detects/outputs a bit clock signal of a certain period which is the least common multiple of the two types of different level transition periods.

The bit clock signal of the certain period is a clock signal of the same period as a bit transition period of the original wobble bit data, as shown in FIG. 11. The bit detector 55 detects a level value of the peak detection signal from the peak detector 53 at a falling edge of the bit clock signal.

At this time, the bit detector 55 detects/outputs wobble data of '0' if the level value of the peak detection signal detected at the falling edge of the bit clock signal is low, and wobble data of '1' if the detected level value is high.

Therefore, the decoded data detected/outputted from the bit detector 55 is demodulated into a value of '0100111011' which is the same as the original wobble data sequence, as shown in FIG. 11. Consequently, as stated previously, there is no need to employ the wobble PLL circuit, and the algorithm and hardware configuration for modulation frequency and phase discrimination can be omitted.

As apparent from the above description, according to the present invention, a wobble signal read from an optical disc can be accurately decoded in a simple manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for converting a wobble data to be recorded as address information on an optical disc, comprising:
   deciding the wobble data to be recorded as the address information;
   deciding a first frequency f1, a second frequency f2, a first phase and a second phase; and
   converting the wobble data into a wobble signal having four types of waveforms based on the decided first and second frequencies and first and second phases,
   wherein said first frequency and second frequency are respectively $$f_1 = \frac{k}{2T_b} \text{ and } f_2 = \frac{p}{2T_b}$$

(Tb=wobble data duration), where k, p=natural numbers and k−p=1, and the phase difference of said first phase and second phase is $\pi$.

2. The method as set forth in claim 1, wherein said wobble signal has a minimum or maximum peak point at a point of time that said first frequency changes to said second frequency and at a point of time that said second frequency changes to said first frequency.

3. The method as set forth in claim 1, wherein k=2n+1 (an odd number which is 3 or more).

4. The method as set forth in claim 1, wherein the first phase is 0 and the second phase is 180°.

5. A method for converting a wobble signal read from an optical disc, comprising:
   receiving the wobble signal from the optical disc; and
   converting the wobble signal into wobble data,
   wherein the wobble signal has four types of waveforms, a frequency of each waveform is one of a first frequency f1 and second frequency f2, and a phase of each waveform is one of a first phase and second phase, and wherein said first frequency and second frequency are respectively $$f_1 = \frac{k}{2T_b} \text{ and } f_2 = \frac{p}{2T_b}$$

(Tb=wobble data duration), where k, p=natural numbers and k−p=1, and the phase difference of said first phase and second phase is π.

6. The method as set forth in claim 5, wherein said wobble signal has a minimum or maximum peak point at a point of time that said first frequency changes to said second frequency and at a point of time that said second frequency changes to said first frequency.

7. The method as set forth in claim 5, wherein k2n+1 (an odd number which is 3 or more).

8. The method as set forth in claim 5, wherein a phase difference of said first phase and second phase is 180°.

9. The method as set forth in claim 5, wherein the first phase is 0 and the second phase is 180°.

10. An apparatus for converting a wobble signal read from an optical, comprising:
   an optical pick-up configured to read the wobble signal from the optical disc; and
   a converting unit configured to convert the wobble signal into wobble data,
   wherein the wobble signal has four types of waveforms, a frequency of each waveform is one of a first frequency f1 and second frequency f2, and a phase of each waveform is one of a first phase and second phase, and
   wherein said first frequency and second frequency are respectively $$f_1 = \frac{k}{2T_b} \text{ and } f_2 = \frac{p}{2T_b}$$

(Tb=wobble data duration), where k, p=natural numbers and k−p=1, and the phase difference of said first phase and second phase is π.

11. The apparatus as set forth in claim 10, wherein said wobble signal has a minimum or maximum peak point at a point of time that said first frequency changes to said second frequency and at a point of time that said second frequency changes to said first frequency.

12. The apparatus as set forth in claim 10, wherein k=2n+1 (an odd number which is 3 or more).

13. The apparatus as set forth in claim 10, wherein a phase difference of said first phase and second phase is 180°.

14. The apparatus as set forth in claim 10, wherein the first phase is 0 and the second phase is 180°.

15. A recording medium having address information for recording, comprising:
   a wobble formed on the optical disc as the address information for a recording/reproducing process,
   wherein the wobble has four types of waveforms, a frequency of each waveform is one of a first frequency f1 and second frequency f2, and a phase of each waveform is one of a first phase and second phase, and
   wherein said first frequency and second frequency are respectively $$f_1 = \frac{k}{2T_b} \text{ and } f_2 = \frac{p}{2T_b}$$

(Tb=wobble data duration), where k, p=natural numbers and k−p=1, and the phase difference of said first phase and second phase is π.

16. The recording medium as set forth in claim 15, wherein said wobble has a minimum or maximum peak point at a point of time thats said first frequency changes to said second frequency and at a point of time that said second frequency changes to said first frequency.

17. The recording medium as set forth in claim 15, wherein k=2n+1 (an odd number which is 3 or more).

18. The recording medium as set forth in claim 15, wherein a phase difference of said first phase and second phase is 180°.

19. The recording medium as set forth in claim 15, wherein the first phase is 0 and the second phase is 180°.

* * * * *